US012276238B2

(12) United States Patent
Chuck et al.

(10) Patent No.: US 12,276,238 B2
(45) Date of Patent: Apr. 15, 2025

(54) MULTIPLE TURN REVERSER WITH SIDE TURNING VANES

(71) Applicant: The Boeing Company, Arlington, VA (US)

(72) Inventors: Chen Chuck, Mercer Island, WA (US); Brian S. Kornegay, Snohomish, WA (US)

(73) Assignee: THE BOEING COMPANY, Arlington, VA (US)

( * ) Notice: Subject to any disclaimer, the term of this patent is extended or adjusted under 35 U.S.C. 154(b) by 209 days.

(21) Appl. No.: 18/161,670

(22) Filed: Jan. 30, 2023

(65) Prior Publication Data

US 2024/0254943 A1    Aug. 1, 2024

(51) Int. Cl.
 *F02K 1/72*   (2006.01)
 *F02K 1/68*   (2006.01)

(52) U.S. Cl.
 CPC .................. *F02K 1/72* (2013.01); *F02K 1/68* (2013.01); *F05D 2220/323* (2013.01)

(58) Field of Classification Search
 CPC . F02K 1/563; F02K 1/62; F02K 1/625; F02K 1/70; F02K 1/72
 See application file for complete search history.

(56) References Cited

U.S. PATENT DOCUMENTS

| | | | | |
|---|---|---|---|---|
| 3,040,524 A | * | 6/1962 | Kurti | F02K 1/64 60/230 |
| 3,493,198 A | * | 2/1970 | Roed | F02K 1/563 60/229 |
| 4,026,105 A | | 5/1977 | James | |
| 4,073,440 A | * | 2/1978 | Hapke | F02K 1/74 239/265.29 |
| 5,284,015 A | * | 2/1994 | Carimali | F02K 1/60 239/265.29 |
| 5,396,762 A | * | 3/1995 | Standish | F02K 1/563 244/110 B |
| 5,706,649 A | * | 1/1998 | Robinson | F02K 1/008 60/229 |
| 2004/0195443 A1 | * | 10/2004 | Lair | F02K 1/70 244/110 B |
| 2013/0221124 A1 | * | 8/2013 | Malecki | F02K 1/72 239/265.29 |
| 2015/0113944 A1 | * | 4/2015 | Pascal | B64D 33/04 239/265.19 |

(Continued)

FOREIGN PATENT DOCUMENTS

| | | |
|---|---|---|
| EP | 1416147 A1 | 5/2004 |
| EP | 3228854 A1 | 10/2017 |
| EP | 3957846 A1 | 2/2022 |

OTHER PUBLICATIONS

Extended European Search Report issued May 29, 2024 in corresponding EP Application No. 23217067.0, 6 pages.

*Primary Examiner* — Gerald L Sung
(74) *Attorney, Agent, or Firm* — MH2 Technology Law Group LLP

(57) ABSTRACT

A thrust reverser in an engine includes a first reverser portion configured to direct a gas in a first direction to create reverse thrust. The thrust reverser also includes a second reverser portion configured to direct the gas in a second direction that is different than the first direction. The second reverser portion is upstream or downstream from the first reverser portion.

6 Claims, 6 Drawing Sheets

(56) References Cited

U.S. PATENT DOCUMENTS

| | | |
|---|---|---|
| 2016/0025037 A1* | 1/2016 | Teia Dos Santos Mendes Gomes .................... F01D 25/24 415/1 |
| 2017/0107944 A1* | 4/2017 | Kawai ....................... F02K 3/06 |
| 2019/0195443 A1* | 6/2019 | Spriggins ............. A61G 15/002 |
| 2023/0313754 A1* | 10/2023 | Wood ...................... F02K 1/766 60/226.2 |

* cited by examiner

MULTIPLE TURN REVERSER WITH SIDE TURNING VANES

BACKGROUND

During landing, commercial airplanes will usually deploy thrust reversers to decelerate the airplane immediately after landing (also referred to as touchdown). The thrust reversers are devices used to turn the jet engine exhaust to a direction with a sufficient forward component to create reverse thrust. Their performance is characterized by a function of reverser mass flow and flow turning efficiency.

Most commercial airplanes equip their engine nacelle with cascade style thrust reversers. The cascade thrust reverser is complicated and has several inefficiencies within. For example, with the cascade thrust reverser, the bullnose usually separates, and the vanes (for forward turning) and strongbacks (for side turning) form a lattice pattern that turns the fan flow. This lattice pattern design has the minimum exit area for the reversed flow located between the vanes. The cascade thrust reversers usually stow inside the aft nacelle, and during deployment, the aft nacelle sleeve is translated aft to expose the cascades. During the start of the deployment, the blocker doors are positioned between the fan cowls to block the fan flow from exiting the forward thrust nozzle. This design results in a complicated mechanical system. Therefore, what is needed is an improved system and method for decelerating an airplane.

SUMMARY

A thrust reverser in an engine is disclosed. The thrust reverser includes a first reverser portion configured to direct a gas in a first direction to create reverse thrust. The thrust reverser also includes a second reverser portion configured to direct the gas in a second direction that is different than the first direction. The second reverser portion is upstream or downstream from the first reverser portion.

An engine on an airplane is also disclosed. The engine includes a thrust reverser configured to actuate from a stowed state into a deployed state. The thrust reverser is in the stowed state when the airplane is in flight. The thrust reverser actuates into the deployed state after the airplane lands. The thrust reverser includes a first reverser portion. Air and exhaust flow through the first reverser portion when the thrust reverser is in the deployed state. The first reverser portion turns the air and the exhaust at least partially in a forward direction to create reverse thrust. The first reverser portion does not turn the air and the exhaust in a circumferential direction with respect to a central engine axis. The first reverser portion remains stationary as the thrust reverser actuates into the deployed state. The thrust reverser also includes a second reverser portion positioned radially-outward from the first reverser portion. The air and the exhaust flow through the second reverser portion when the thrust reverser is in the deployed state. The second reverser portion turns the air and the exhaust at least partially in the circumferential direction with respect to the central engine axis such that the air and the exhaust are directed away from a fuselage and a wing of the airplane. The second reverser portion does not turn the air and the exhaust in the forward direction. The second reverser portion remains axially-stationary as the thrust reverser actuates into the deployed state. The second reverser portion includes a plurality of louvers that are circumferentially-offset from one another around the central engine axis. The louvers each have a central louver axis extending therethrough. The louvers each rotate around their respective central louver axes as the thrust reverser actuates into the deployed state.

A method for actuating a thrust reverser in an engine into a deployed state is disclosed. The method includes actuating a blocker door from a first position into a second position. The blocker door in the first position permits gas to exit the engine via a first outlet. The blocker door in the second position diverts at least a portion the gas such that the diverted portion of the gas flows through the thrust reverser and exits the engine via a second outlet. A first reverser portion of the thrust reverser directs the diverted portion of the gas in a first direction to create reverse thrust. A second reverser portion of the thrust reverser directs the diverted portion of the gas in a second direction that is different than the first direction. The second reverser portion is upstream or downstream from the first reverser portion.

DRAWINGS

The above and/or other aspects and advantages will become more apparent and more readily appreciated from the following detailed description of examples, taken in conjunction with the accompanying drawings, in which.

DETAILED DESCRIPTION

Figure 1:
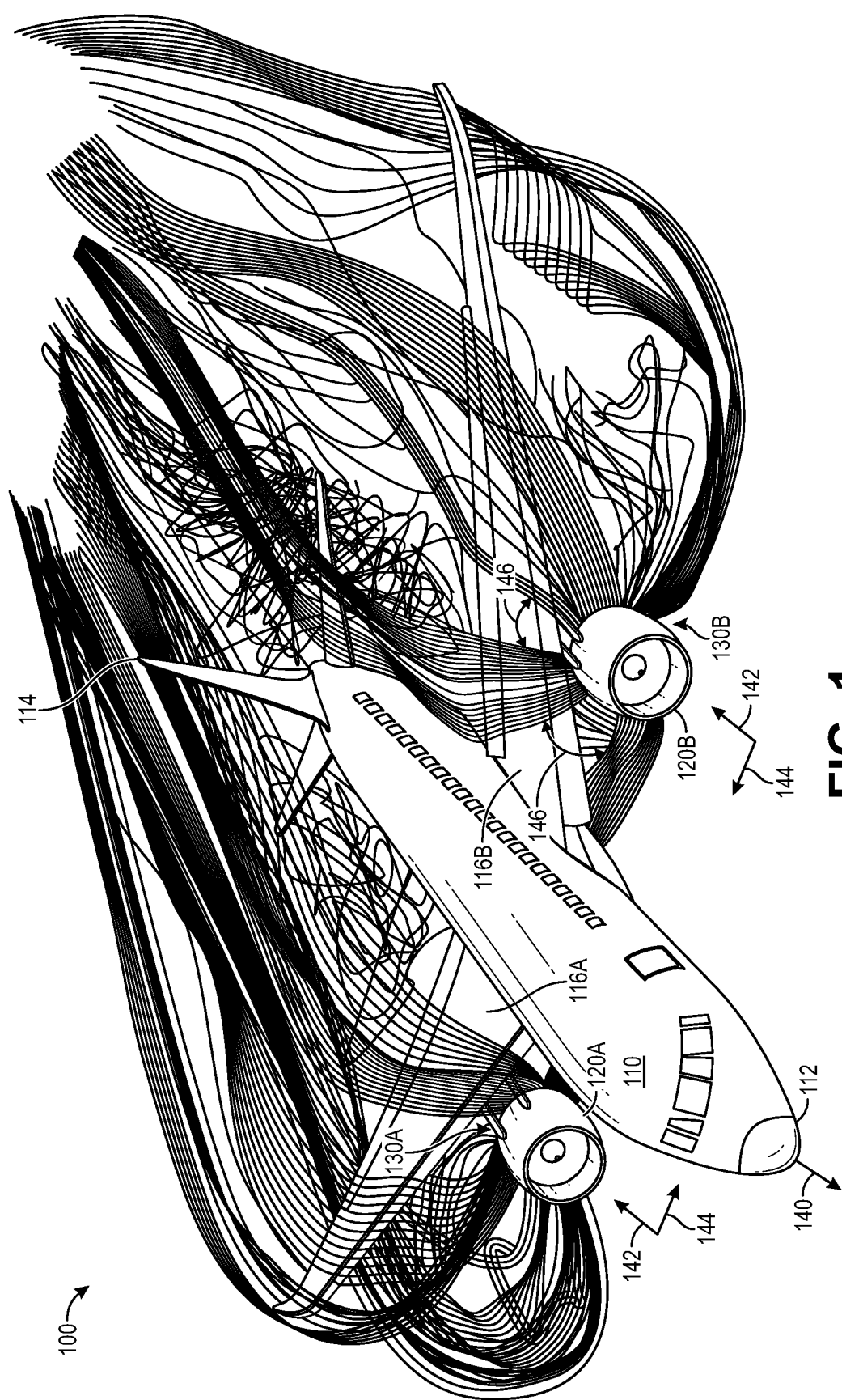
FIG. 1 illustrates a perspective view of an aircraft using thrust reversers to decelerate after landing, according to an example.

Exemplary aspects will now be described more fully with reference to the accompanying drawings. Examples of the disclosure, however, can be embodied in many different forms and should not be construed as being limited to the examples set forth herein. Rather, these examples are provided so that this disclosure will be thorough and complete, and will fully convey the scope to those skilled in the art. In the drawings, some details may be simplified and/or may be drawn to facilitate understanding rather than to maintain strict structural accuracy, detail, and/or scale.

It will be understood that when an element is referred to as being "on," "associated with," "connected to," "electrically connected to," or "coupled to" to another component, it may be directly on, associated with, connected to, electrically connected to, or coupled to the other component or intervening components may be present. In contrast, when a component is referred to as being "directly on," "directly associated with," "directly connected to," "directly electrically connected to," or "directly coupled to" another component, there are no intervening components present. As used herein, the term "and/or" includes any and all combinations of one or more of the associated listed items.

It will be understood that although the terms first, second, etc., may be used herein to describe various elements, components, and/or directions, these elements, components, and/or directions should not be limited by these terms. These terms are only used to distinguish one element, component, and/or direction from another element, component, and/or direction. For example, a first element, component, or direction could be termed a second element, component, or direction without departing from the teachings of examples.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation(s) depicted in the figures.

FIG. 1 illustrates a perspective view of an aircraft 100, according to an example. In the example shown, the aircraft 100 is an airplane; however, in other implementations, the aircraft 100 may be or include a spacecraft, a drone, a helicopter, or the like. In yet other implementations, the system and method described herein may be incorporated into other moving objects (e.g., vehicles) that are not aircrafts, such as cars, boats, etc.

The aircraft 100 may include a fuselage 110, nose 112, a tail 114, and wings 116A, 116B. Each wing 116A, 116B may include one or more engines (two are shown: 120A, 120B). Each engine 120A, 120B may include one or more thrust reversers (two are shown: 130A, 130B). The thrust reversers 130A, 130B may be in a first (e.g., stowed) state during takeoff and/or flight. The thrust reversers 130A, 130B may actuate into a second (e.g., deployed) state after the aircraft 100 lands. For example, the thrust reversers 130A, 130B may actuate into the deployed state immediately (e.g., within 5 seconds) after touchdown. As described in greater detail below, the thrust reversers 130A, 130B in the deployed state may help to decelerate the aircraft 100.

More particularly, the aircraft 100 may be moving in a forward direction 140 immediately after touchdown. As a result, air may enter and move through the engines 120A, 120B in a backward direction 142 toward an aft (e.g., the tail 114) of the aircraft 100. When the thrust reversers 130A, 130B are in the stowed state, the air and/or exhaust may exit the engines 120A, 120B via one or more first outlets 122 (see FIG. 2) in the engines 120A, 120B in the backward direction 142.

However, when the thrust reversers 130A, 130B are actuated into the deployed state, as shown in FIG. 1, at least a portion of the air and/or exhaust may be prevented from exiting the engines 120A, 120B via the one or more first outlets 122 in the engines 110A, 110B in the direction 142. Rather, this portion may be diverted by and/or through the thrust reversers 130A, 130B such that the diverted portion (of the air and/or exhaust) exits the engines 120A, 120B via one or more second outlets 124 (see FIG. 2) in the engines 120A, 120B in a lateral (e.g., radial) direction 144 that is perpendicular to the forward and backward directions 140, 142. The first outlets 122 may be positioned aft of the second outlets 124 (i.e., closer to the tail 114 of the aircraft 100).

The thrust reversers 130A, 130B may direct (e.g., turn) the diverted portion at least partially in the forward direction 140 to generate a sufficient forward component to create reverse thrust. This may increase the deceleration of the aircraft 100. The thrust reversers 130A, 130B may also direct the diverted portion at least partially in a circumferential direction 146 to direct the diverted portion away from the fuselage 110 and/or wings 116A, 116B. This may cause the diverted portion to form the X-shape seen in FIG. 1.

Figure 2:
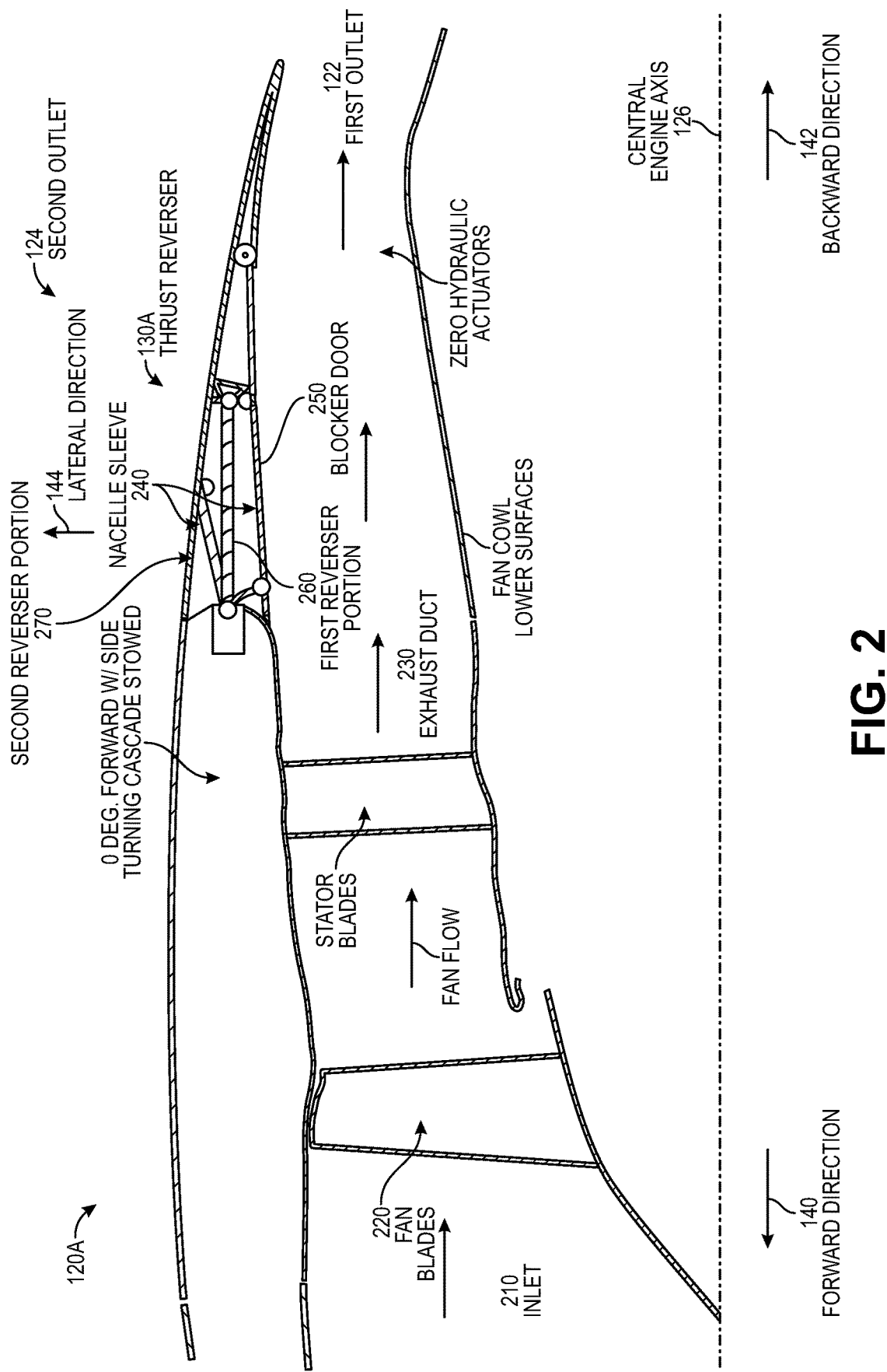
FIG. 2 illustrates a cross-sectional side view of a portion of an engine of the aircraft with the thrust reverser in a first (e.g., stowed) state, according to an example.

FIG. 2 illustrates a cross-sectional side view of a portion of the engine 120A with the thrust reverser 130A in the first (e.g., stowed) state, according to an example. As mentioned above, the thrust reverser 130A may be in the stowed state when the airplane 100 is taking off and/or in flight.

The engine 120A may include an inlet 210 configured to receive the air. The engine 120A may also include a fan 220 positioned aft from the inlet 210. The fan 220 may be configured to pressurize the air, which moves the air in the backward direction 142, as shown by the arrows. The engine 120A may also include an exhaust duct 230 positioned aft from the fan 220. The pressurized air and exhaust may flow through the exhaust duct 230 and exit the engine 120A via the first outlet 122 when the thrust reverser 130A is in the stowed state.

The engine 120A (e.g., the thrust reverser 130A) may include a nacelle sleeve 240. In one implementation, the nacelle sleeve 240 may be configured to actuate (e.g., axially) between a first position and a second position. In this implementation, the nacelle sleeve 240 may be in the first position when the thrust reverser 130A is in the stowed state. In another implementation, the nacelle sleeve 240 may not actuate (e.g., axially) to use the thrust reverser 130A.

Figure 3:
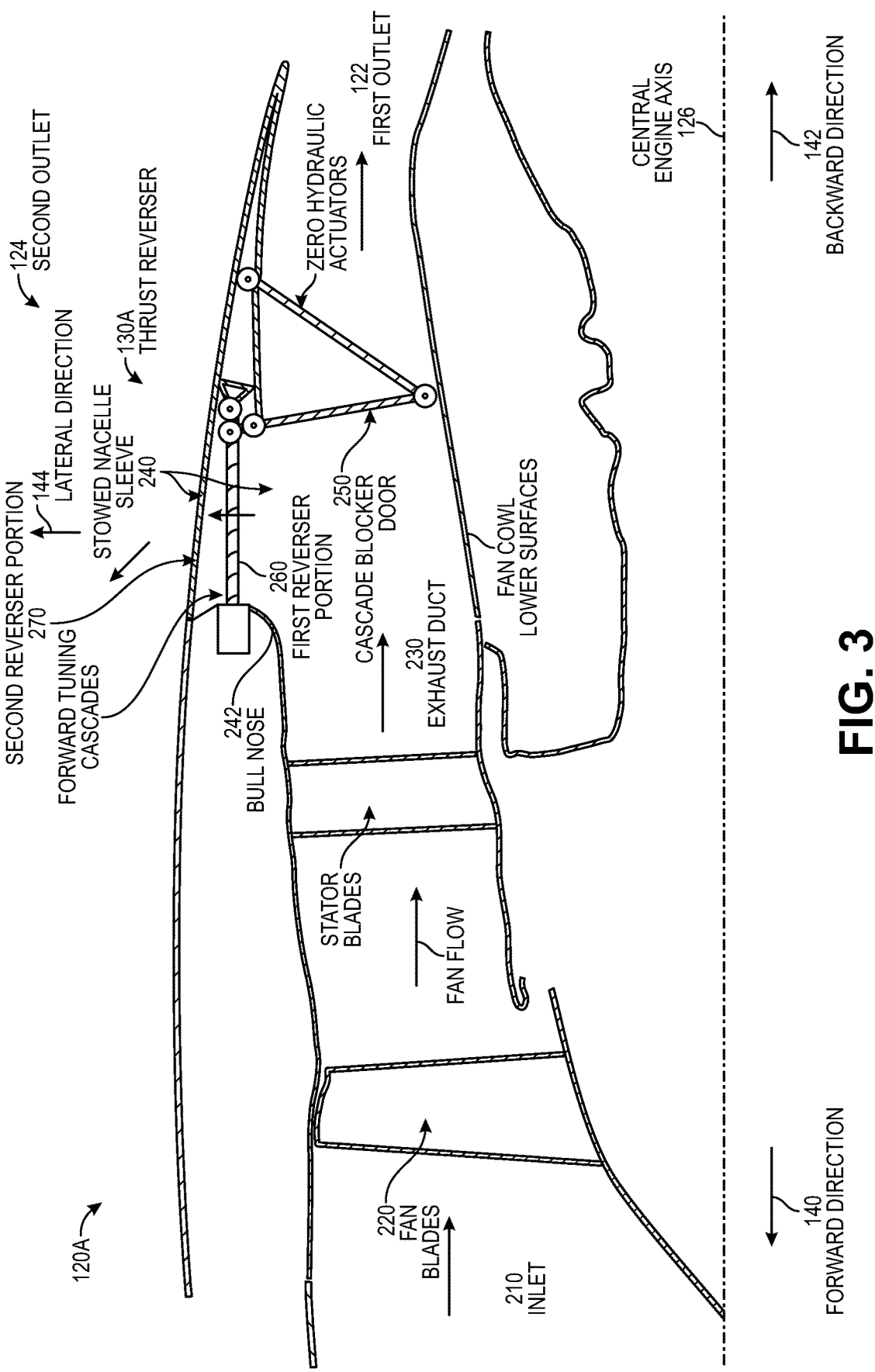
FIG. 3 illustrates a cross-sectional side view of the portion of the engine with the thrust reverser in a second (e.g., deployed) state, according to an example.

The engine 120A (e.g., the thrust reverser 130A) may also include a blocker door 250. The blocker door 250 may be configured to actuate between a first position (FIG. 2) and a second position (FIG. 3). The blocker door 250 may be in the first position when the thrust reverser 130A is in the stowed state. The blocker door 250 may be positioned at least partially within the nacelle sleeve 240 when the thrust reverser 130A is in the stowed state. The blocker door 250 may also or instead be positioned radially-outward from at least a portion of the nacelle sleeve 240 (e.g., with respect to a central engine axis 126) when the thrust reverser 130A is in the stowed state. The blocker door 250 in the first position allows the air and exhaust to flow downstream (e.g., in the backward direction 142) through the exhaust duct 230 and out of the engine 120A via the first outlet 122.

The engine 120A (e.g., the thrust reverser 130A) may also include a first reverser portion 260. The first reverser portion 260 may be positioned aft from the fan 220. The first reverser portion 260 may be positioned at least partially within the nacelle sleeve 240 when the thrust reverser 130A is in the stowed state. The first reverser portion 260 may also or instead be positioned radially-outward from at least a portion of the nacelle sleeve 240 and/or the blocker door 250 (e.g., with respect to the central engine axis 126) when the thrust reverser 130A is in the stowed state.

The engine 120A (e.g., the thrust reverser 130A) may also include a second reverser portion 270. The second reverser portion 270 may be positioned aft from the fan 220. The second reverser portion 270 may be positioned at least partially within the nacelle sleeve 240 when the thrust reverser 130A is in the stowed state. The second reverser portion 270 may also or instead be positioned radially-outward from at least a portion of the nacelle sleeve 240, the blocker door 250, and/or the first reverser portion 260 (e.g., with respect to the central engine axis 126) when the thrust reverser 130A is in the stowed state. The second reverser portion 270 may also or instead be positioned upstream and/or downstream from the first reverser portion 260 with respect to the direction of gas flow (e.g., the lateral direction 144) when the gas exits the engine 120A via the second outlet 124.

FIG. 3 illustrates a cross-sectional side view of the portion of the engine 120A with the thrust reverser 130A in the second (e.g., deployed) state, according to an example. As mentioned above, the thrust reverser 130A may actuate into the deployed state after the aircraft 100 lands.

In one implementation, actuating the thrust reverser 130A into the second state may include actuating the nacelle sleeve 240 into the second position. The actuation may be in the backward direction 142. Thus, the second position may be aft of the first position. In another implementation, the thrust reverser 130A may be actuated into the second state without actuating the nacelle sleeve 240 (e.g., while the nacelle sleeve 240 remains stationary).

Actuating the thrust reverser 130A into the second state may also include actuating the blocker door 250 into the second position. The blocker door 250 in the second position may divert at least a portion of the air and the exhaust so that the diverted portion does not flow downstream through the exhaust duct 230 and out of the engine 120A via the first outlet 122. Rather, the diverted portion flows in the lateral (e.g., radial) direction 144 and exits the engine 120A via the second outlet 124, as shown by the arrows. The diverted portion may flow through and/or be directed by the first reverser portion 260 and the second reverser portion 270.

In one implementation, the first reverser portion (also referred to as a forward-turning cascade) 260 may direct the diverted portion at least partially in the forward direction 140 to generate a sufficient forward component to create reverse thrust. The first reverser portion 260 may not turn the diverted portion circumferentially with respect to the central engine axis 126. The first reverser portion 260 may remain stationary as the thrust reverser 130A actuates into the deployed state.

In one implementation, the second reverser portion (also referred to as a side-turning strongback) 270 may direct the diverted portion at least partially in the circumferential direction (into and/or out of the page in FIG. 3). This may direct the diverted portion away from the fuselage 110 and/or wings 116A, 116B. The second reverser portion 270 may not direct the diverted portion in the forward direction 140. The first reverser portion 260 and/or second reverser portion 270 may not move axially (e.g., in the forward direction 140 or backward direction 142) as the thrust reverser 130A actuates into the second state. For example, the second reverser portion 270 may remain axially-stationary as the thrust reverser 130A actuates into the deployed state.

Separating the thrust reverser 130A into two or more portions 260, 270 that are spaced apart from one another may reduce the axial length and/or the weight of the thrust reverser 130A. In one example, a length of the thrust reverser 130A may be from about 10% to about 20%, about 20% to about 30%, about 30% to about 40%, about 40% to about 50%, or about 50% to about 60% of a length of the engine 120A. In another example, a length of the thrust reverser 130A may be about 10 inches shorter than conventional thrust reversers. The length of the thrust reverser 130A may be measured in the forward and/or backward direction 140, 142. For example, the length of the thrust reverser 130A may be measured from an aft end of a bullnose 242 to a forward end of the nacelle sleeve 240.

Figure 4:
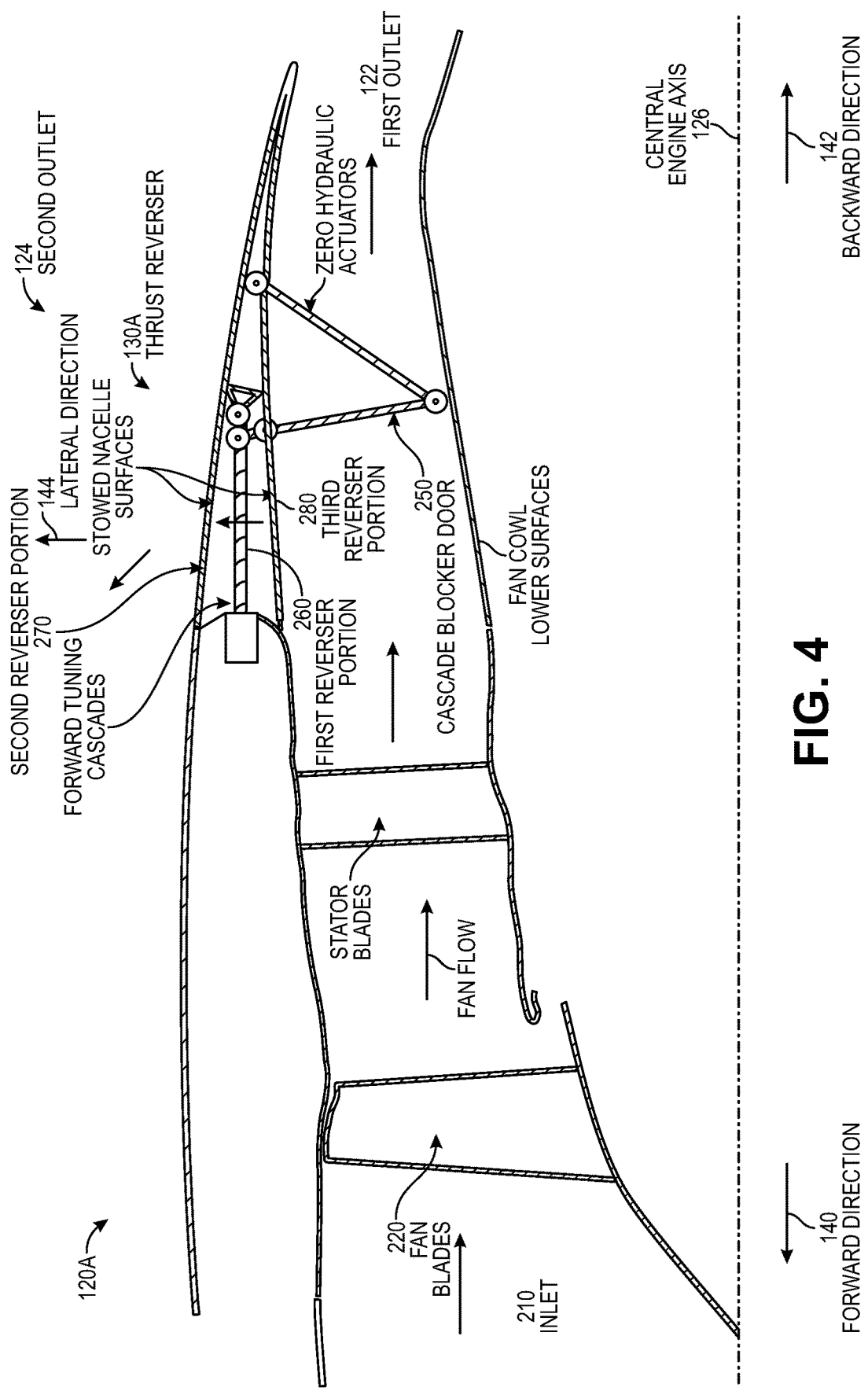
FIG. 4 illustrates a cross-sectional side view of the portion of the engine with the thrust reverser in the second (e.g., deployed) state, according to an example.

FIG. 4 illustrates a cross-sectional side view of the portion of the engine 120A with the thrust reverser 130A in the second (e.g., deployed) state, according to an example. FIG. 4 is similar to FIG. 3, except that FIG. 4 shows a third thrust reverser portion 280.

The third reverser portion 280 may be positioned aft from the fan 220. The third reverser portion 280 may be positioned at least partially within the nacelle sleeve 240 when the thrust reverser 130A is in the stowed state. The third reverser portion 280 may also or instead be positioned radially-inward from the first and/or second reverser portions 260, 270. Thus, in the example shown, the first reverser portion 260 may be positioned (e.g., radially) between the second and third reverser portions 270, 280.

In one implementation, the third reverser portion 280 may be configured to direct (e.g., turn) the diverted portion at least partially in the forward direction 140 to increase the forward component, thereby increasing the reverse thrust. In another implementation, the third reverser portion 280 may direct the diverted portion at least partially in the circumferential direction 146 to increase the circumferential component. However, the third reverser portion 280 may not direct the diverted portion in both the forward and circumferential directions 140, 146.

Figure 5B:
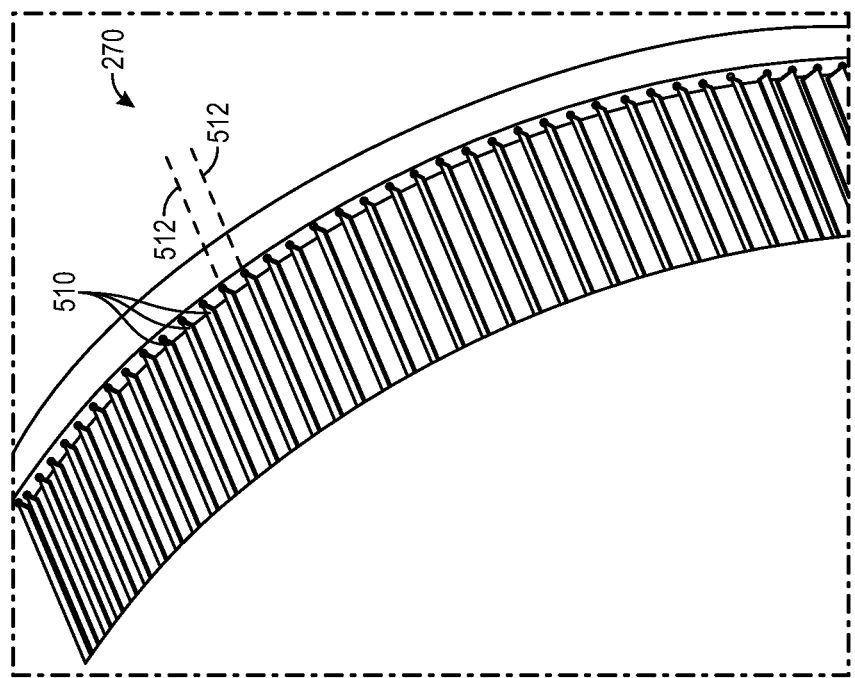
FIG. 5B illustrates an enlarged view of a portion of FIG. 5A, according to an example.
Figure 5A:
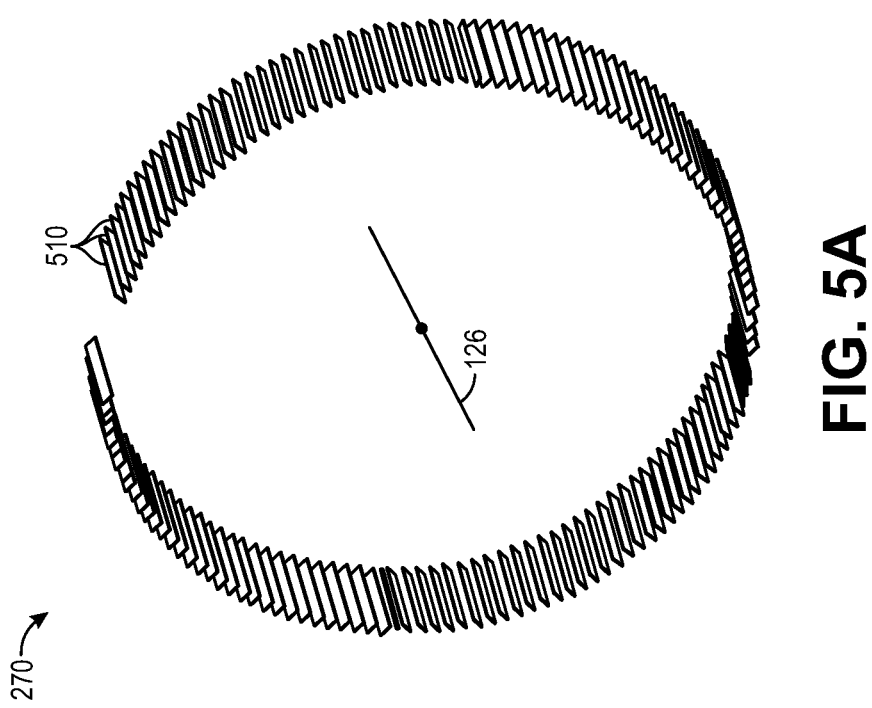
FIG. 5A illustrates a perspective view of a side-turning portion of the thrust reverser, according to an example.

FIG. 5A illustrates a perspective view of one of the reverser portions 260, 270, 280 (e.g., the second reverser portion 270), and FIG. 5B illustrates an enlarged view of a portion of FIG. 5A, according to an example. The second reverser portion 270 may be in the shape of a ring around the central engine axis 126. The second reverser portion 270 may include a plurality of louvers 510 that are circumferentially-offset from one another with respect to the central engine axis 126. In one implementation, the first reverser portion 260 may not include any lovers 510. The louvers 510 may be substantially flat. In an alternative implementation, the louvers 510 may be at least partially curved. The louvers 510 may be substantially rectangular. The louvers 510 each have a central louver axis 512 extending therethrough. The central louver axes 512 are substantially parallel to, and radially-outward from, the central engine axis 126.

The second reverser portion 270 may be configured to actuate from a first position into a second position. This may include the louvers 510 rotating around their respective central louver axes 512 (e.g., like window blinds) from a first position to a second position as the thrust reverser 130A actuates from the stowed state into the deployed state and/or vice versa. More particularly, the louvers 510 may be oriented such that inner surfaces thereof face the central engine axis 126 when thrust reverser 130A is in the stowed state. This may minimize the radial thickness of the second reverser portion 270 and/or minimize the circumferential gaps between each pair of adjacent louvers 510. The louvers 510 may rotate around their respective central louver axes 512 as the thrust reverser 130A actuates into the deployed state. This may increase the radial thickness of the second reverser portion 270 and/or increase the size of the circumferential gaps between each pair of adjacent louvers 510. The louvers 510 may direct the diverted portion (of the air and/or exhaust) in the circumferential direction 146 when the thrust reverser 130A is in the deployed state.

Figure 6:
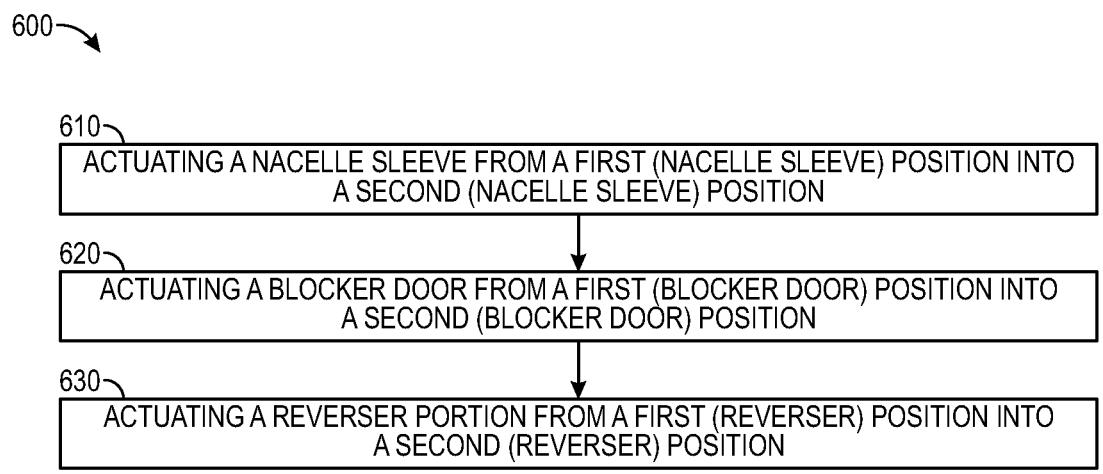
FIG. 6 illustrates a flowchart of a method for operating the thrust reversers, according to an example.

FIG. 6 illustrates a flowchart of a method 600 for actuating the thrust reverser 130A from the stowed state into the deployed state, according to an example. An illustrative order of the method 600 is provided below; however, one or more steps of the method 600 may be performed in a different order, combined, repeated, or omitted.

The method 600 may include actuating the nacelle sleeve 240 from the first (nacelle sleeve) position into the second (nacelle sleeve) position, as at 610. This may include moving the nacelle sleeve 240 in the aft direction, which may uncover the blocker door 250, the first reverser portion 260, and/or the second reverser portion 270. The movement of the nacelle sleeve 240 may also permit movement of the blocker door 250 and/or the second reverser portion 270. In another implementation, the nacelle sleeve 240 may remain stationary, while still allowing movement of the blocker door 250 and/or the second reverser portion 270.

The method 600 may also include actuating the blocker door 250 from the first (blocker door) position into the second (blocker door) position, as at 620. As mentioned above, the blocker door 250 in the second position may divert a portion of the gas (e.g., air and/or exhaust) toward the second outlet 124.

The method 600 may also include actuating the second reverser portion 270 from the first (reverser) position into the second (reverser) position, as at 630. This may include the louvers 510 rotating around their central louver axes 512 from the first (louver) position into the second (louver) position. In one implementation, the second reverser portion 270 may actuate simultaneously with the nacelle sleeve 240 and/or the blocker door 250. In another implementation, the second reverser portion 270 may actuate after the nacelle sleeve 240 and/or the blocker door 250. For example, the second reverser portion 270 may be (e.g., physically) prevented from actuating when the nacelle sleeve 240 is in the first position and/or the blocker door 250 is in the first position. In yet another implementation, the second reverser portion 270 may actuate without actuating the nacelle sleeve 240. When the engine 120A (e.g., the thrust reverser 130A) includes the third reverser portion 280, step 616 may be performed for the second and third reverser portions 270, 280 sequentially or simultaneously.

As mentioned above, when the thrust reverser 130A is in the deployed state, the first reverser portion 260 may direct (e.g., turn) the diverted portion at least partially in the forward direction 140 to generate a sufficient forward component to create reverse thrust to facilitate deceleration of the aircraft 100. In addition, when the thrust reverser 130A is in the deployed state, the second and/or third reverser portions 270, 280 may direct (e.g., turn) the diverted portion at least partially in the circumferential direction 146 (e.g., away from the fuselage 110 and/or wings 116A, 116B) so that the diverted portion does not damage the aircraft 100.

While the foregoing disclosure has been described in some detail by way of illustration and example for purposes of clarity and understanding, it will be clear to one of ordinary skill in the art from a reading of this disclosure that various changes in form and detail can be made without departing from the true scope of the disclosure and may be practiced within the scope of the appended claims. For example, all the methods, systems, and/or component parts or other aspects thereof can be used in various combinations. All patents, patent applications, websites, other publications or documents, and the like cited herein are incorporated by reference in their entirety for all purposes to the same extent as if each individual item were specifically and individually indicated to be so incorporated by reference.

What is claimed is:

1. An engine on an airplane, the engine comprising:
 a thrust reverser configured to actuate from a stowed state into a deployed state, wherein the thrust reverser is in the stowed state when the airplane is in flight, wherein the thrust reverser actuates into the deployed state after the airplane lands, and wherein the thrust reverser comprises:
  a first reverser portion, wherein air flows through the first reverser portion when the thrust reverser is in the deployed state, wherein the first reverser portion turns the air at least partially in a forward direction to create reverse thrust, wherein the first reverser portion does not turn the air in a circumferential direction with respect to a central engine axis, and wherein the first reverser portion remains stationary as the thrust reverser actuates into the deployed state;
  a second reverser portion positioned radially-outward from the first reverser portion, wherein the air flows through the second reverser portion when the thrust reverser is in the deployed state, wherein the second reverser portion turns the air at least partially in the circumferential direction with respect to the central engine axis such that the air is directed away from a fuselage and a wing of the airplane, wherein the second reverser portion does not turn the air in the forward direction, wherein the second reverser portion remains axially-stationary as the thrust reverser actuates into the deployed state, wherein the second reverser portion comprises a plurality of louvers that are circumferentially-offset from one another around the central engine axis, wherein the plurality of louvers each have a central louver axis extending therethrough, and wherein the plurality of louvers each rotate around their respective central louver axes as the thrust reverser actuates into the deployed state; and
  a blocker door configured to actuate from a first position to a second position, wherein the first position is radially-outward from the second position, wherein the blocker door is in the first position when the thrust reverser is in the stowed state, wherein the blocker door actuates into the second position when the thrust reverser actuates into the deployed state, wherein the blocker door in the first position allows the air to flow out of the engine via a first outlet, wherein the blocker door in the second position diverts at least a portion of the air so that the air flows out of the engine via a second outlet, and wherein the first outlet is aft of the second outlet.

2. An engine on an airplane, the engine comprising:
 a thrust reverser configured to actuate from a stowed state into a deployed state, wherein the thrust reverser is in the stowed state when the airplane is in flight, wherein the thrust reverser actuates into the deployed state after the airplane lands, and wherein the thrust reverser comprises:
  a first reverser portion, wherein air flows through the first reverser portion when the thrust reverser is in the deployed state, wherein the first reverser portion turns the air at least partially in a forward direction to create reverse thrust, wherein the first reverser portion does not turn the air in a circumferential direction with respect to a central engine axis, and wherein the first reverser portion remains stationary as the thrust reverser actuates into the deployed state;
  a second reverser portion positioned radially-outward from the first reverser portion, wherein the air flows through the second reverser portion when the thrust reverser is in the deployed state, wherein the second reverser portion turns the air at least partially in the circumferential direction with respect to the central engine axis such that the air is directed away from a fuselage and a wing of the airplane, wherein the second reverser portion does not turn the air in the forward direction, wherein the second reverser portion remains axially-stationary as the thrust reverser actuates into the deployed state, wherein the second reverser portion comprises a plurality of louvers that are circumferentially-offset from one another around the central engine axis, wherein the plurality of louvers each have a central louver axis extending therethrough, and wherein the plurality of louvers each rotate around their respective central louver axes as the thrust reverser actuates into the deployed state; and a third reverser portion, wherein the first reverser portion is positioned radially-between the second and third reverser portions, wherein the air flows through the third reverser portion when the thrust reverser is in the deployed state, and wherein the third reverser portion turns the air at least partially in the circumferential direction with respect to the central engine axis such that the air is directed away from the fuselage and the wings of the airplane.

3. The engine of claim 2, wherein a radial thickness of the second reverser portion increases as the thrust reverser actuates into the deployed state, and wherein circumferential gaps between each two adjacent louvers of the plurality of louvers increase as the thrust reverser actuates into the deployed state.

4. The engine of claim 2, wherein the thrust reverser further comprises a blocker door configured to actuate from a first position to a second position, wherein the first position is radially-outward from the second position, wherein the blocker door is in the first position when the thrust reverser is in the stowed state, wherein the blocker door actuates into the second position when the thrust reverser actuates into the deployed state, wherein the blocker door in the first position allows the air to flow out of the engine via a first outlet, wherein the blocker door in the second position diverts at least a portion of the air so that the air flows out of the engine via a second outlet, and wherein the first outlet is aft of the second outlet.

5. The engine of claim 2, wherein a length of the first reverser portion, the second reverser portion, or both is from 10% to 30% of a length of the engine.

6. A method for actuating a thrust reverser in an engine into a deployed state, the method comprising:

actuating the thrust reverser from a stowed state into a deployed state, wherein the thrust reverser is in the stowed state when an airplane is in flight, wherein the thrust reverser actuates into the deployed state after the airplane lands, and wherein the thrust reverser comprises:

a first reverser portion, wherein air flow through the first reverser portion when the thrust reverser is in the deployed state, wherein the first reverser portion turns the air at least partially in a forward direction to create reverse thrust, wherein the first reverser portion does not turn the air in a circumferential direction with respect to a central engine axis, and wherein the first reverser portion remains stationary as the thrust reverser actuates into the deployed state; and a second reverser portion positioned radially-outward from the first reverser portion, wherein the air flows through the second reverser portion when the thrust reverser is in the deployed state, wherein the second reverser portion turns the air at least partially in the circumferential direction with respect to the central engine axis such that the air is directed away from a fuselage and a wing of the airplane, wherein the second reverser portion does not turn the air in the forward direction, wherein the second reverser portion remains axially-stationary as the thrust reverser actuates into the deployed state, wherein the second reverser portion comprises a plurality of louvers that are circumferentially-offset from one another around the central engine axis, wherein the plurality of louvers each have a central louver axis extending therethrough, and wherein the plurality of louvers each rotate around their respective central louver axes as the thrust reverser actuates into the deployed state; and actuating a blocker door from a first position into a second position, wherein the first position is radially-outward from the second position, wherein the blocker door is in the first position when the thrust reverser is in the stowed state, wherein the blocker door actuates into the second position when the thrust reverser actuates into the deployed state, wherein the blocker door in the first position allows the air to flow out of the engine via a first outlet, wherein the blocker door in the second position diverts at least a portion of the air so that the air flows out of the engine via a second outlet, and wherein the first outlet is aft of the second outlet.

* * * * *